United States Patent
Butera et al.

(10) Patent No.: US 6,910,299 B2
(45) Date of Patent: Jun. 28, 2005

(54) TRAP WITH LEVELING STRUCTURE

(75) Inventors: Richard Butera, deceased, late of Willoughby Hills, OH (US); by Barry L. Butera, legal representative, Euclid, OH (US)

(73) Assignee: Butera Manufacturing, Inc., Cleveland, OH (US)

( * ) Notice: Subject to any disclaimer, the term of this patent is extended or adjusted under 35 U.S.C. 154(b) by 0 days.

(21) Appl. No.: 10/386,848

(22) Filed: Mar. 12, 2003

(65) Prior Publication Data

US 2004/0177546 A1 Sep. 16, 2004

(51) Int. Cl.⁷ .............................................. A01M 23/26
(52) U.S. Cl. ........................................................ 43/88
(58) Field of Search ................. 43/88, 90, 91

(56) References Cited

U.S. PATENT DOCUMENTS

| | | |
|---|---|---|
| 833,827 A | 10/1906 | Dawkins |
| 1,004,007 A | 9/1911 | Freeman |
| 1,266,751 A | 5/1918 | Alexander |
| 1,540,691 A | 6/1925 | Gibbs |
| 1,612,608 A | 12/1926 | Chamberlin |
| 1,728,228 A | 9/1929 | Coe |
| 1,840,581 A | 1/1932 | Helbert |
| 1,893,974 A | 1/1933 | Zook |
| 2,241,529 A | 1/1941 | Taylor |
| 2,484,470 A | 10/1949 | Schreiber |
| 3,797,162 A * | 3/1974 | Conibear .................. 43/90 |
| 3,808,729 A * | 5/1974 | Gilbaugh .................. 43/88 |
| 4,127,959 A * | 12/1978 | Loeffler ................... 43/88 |
| 4,416,081 A | 11/1983 | Askins |
| 4,486,972 A * | 12/1984 | Helfrich et al. ........... 43/88 |
| 4,557,068 A * | 12/1985 | Thomas et al. ........... 43/90 |
| 4,817,674 A * | 4/1989 | Luke ....................... 43/88 |
| 5,109,627 A * | 5/1992 | Lee ......................... 43/88 |

* cited by examiner

Primary Examiner—Peter M. Poon
Assistant Examiner—Bethany L. Griles
(74) Attorney, Agent, or Firm—Tucker Ellis & West LLP

(57) ABSTRACT

A trap is disclosed in which first and second co-acting jaws are provided for pivotally engaging a member of a captured animal, wherein the first and second jaws are configured for pivotal displacement between an opened position and a closed position. Levers are loaded with a biasing force for loading the first and second jaws into the closed position. A retaining arrangement is provided for retaining the first jaw in the opened position, wherein the retaining arrangement releases the loaded first and second jaws upon actuation. A leveling structure is used for providing first and second contact surfaces for the at least one lever so as to provide level contact surfaces for the respective first and second jaws.

12 Claims, 4 Drawing Sheets

TRAP WITH LEVELING STRUCTURE

BACKGROUND OF THE INVENTION

The present invention is directed to the field of trapping, in particular, small traps of the type used for catching small animals in the wild for food and pelts, e.g. rabbits, foxes, raccoons, etc. It is also common to set such trap to catch vermin and pests, e.g. skunks, rats, etc.

A common-type trap 10 is shown in FIG. 1. A pair of co-acting jaws 12a, 12b are used to securely engage the leg or other member of a captured animal. The ends of the jaws 12a, 12b are pivotally connected to a body portion 14 for pivotal displacement between an opened position (for a set trap) and a closed position (for engagement with a captured animal). A pair of levers 16 are loaded with a biasing force from an arrangement of springs 18. In this way, the levers 16 bias the jaws 12a, 12b into the closed position. To set the trap, as shown in FIG. 2A, the levers 16 are depressed, loading the springs 18 and allowing the jaws 12a, 12b to be placed in the opened position, along a level line A—A as shown in FIGS. 1, 2A and 2B. A first jaw 12a is placed level and a dog 20 is laid over the top of the jaw 12a. The end of the dog 20 is placed underneath a pan 22. In this way, the dog 20 and the pan 22 retain the jaws 12a, 12b in the opened position, with the spring-biased levers 16 fully loaded. When an animal steps on the pan 22, the pan 22 tilts to release the dog 20, which in turn releases the jaw 12a and springs the trap, where the loaded levers 16 pivot the jaws 12a, 12b to the closed position, securely capturing the animal.

As shown in FIG. 2A, only the first jaw 12a is securely retained by the dog 20. The second jaw 12b is allowed to lay loose. This results in a problem known as "jaw lift." When the trap 10 is loaded, a the first jaw 12a applies a torsional twist to the levers 16, causing one side to of each lever to be depressed and the other side to be elevated. The first jaw 12a lays on top of the depressed side, and is retained in a position flat with respect to the level line A—A. The second jaw 12b is not firmly retained, and sits on top of the elevated side of the levers 16. In this way, the second jaw 12b thus tends to sit a little higher than the first jaw 12a. As a result, the second jaw 12b tends to lift, lying at an angle to line A—A as shown by line B in FIGS. 2A and 2B. In operation, it can happen that the animal may bump the lifted jaw 12b and swing it onto the retained jaw 12a. In this event, the trap 10 can be sprung without capturing the animal. Many previous approaches have been made to address this well known problem. However, such approaches create other problems with trap function and none are known to provide a satisfactory solution.

SUMMARY OF THE INVENTION

The difficulties and drawbacks associated with previous devices are overcome by the trap of the present invention in which first and second co-acting jaws are provided for pivotally engaging a member of a captured animal, wherein the first and second jaws are configured for pivotal displacement between an opened position and a closed position. Levers are loaded with a biasing force for loading the first and second jaws into the closed position. A retaining arrangement is provided for retaining the first jaw in the opened position, wherein the retaining arrangement releases the loaded first and second jaws upon actuation. A leveling structure is used for providing first and second contact surfaces for the at least one lever so as to provide level contact surfaces for the respective first and second jaws.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE INVENTION

Figure 1:
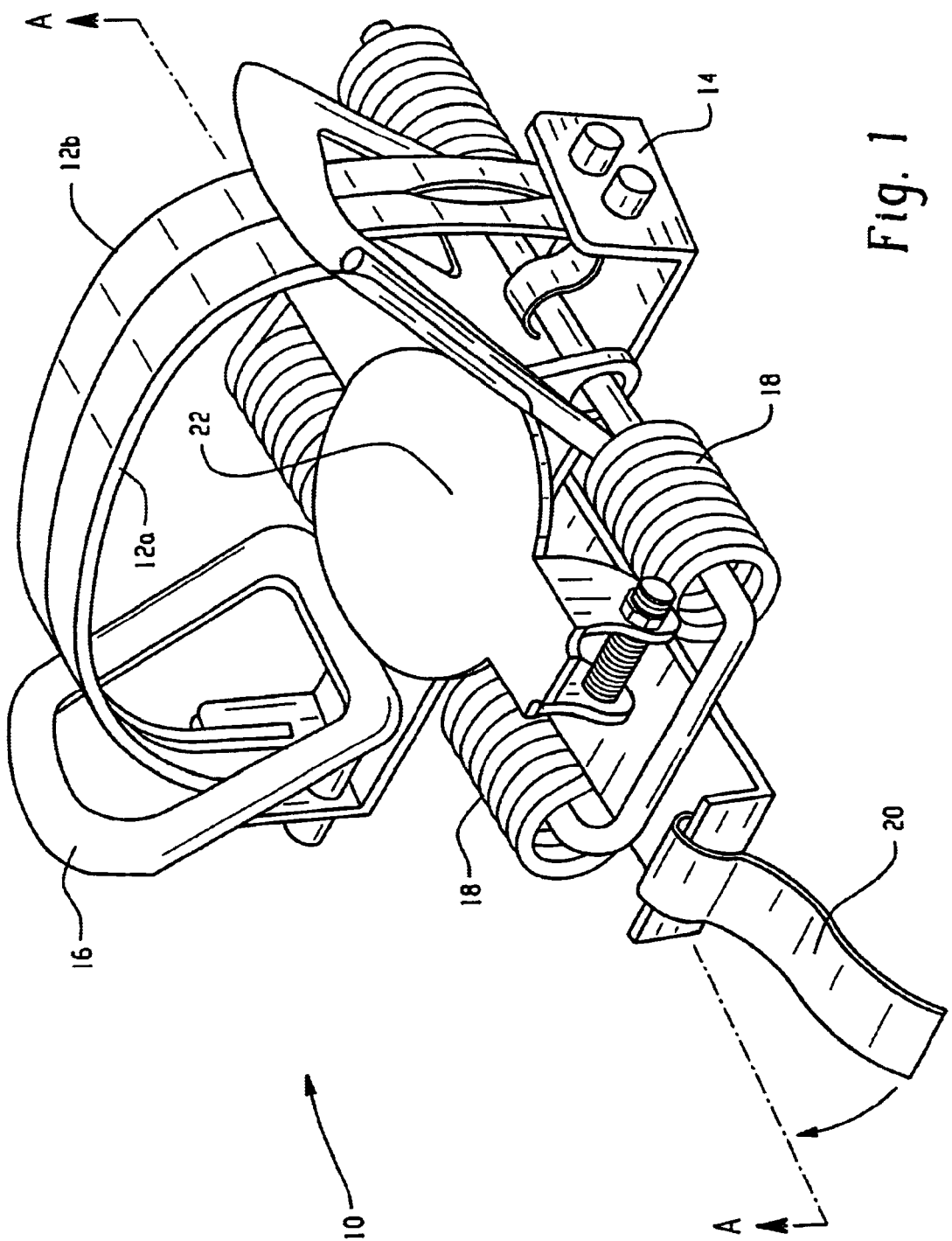
FIG. 1 is a perspective view of a previous-type trap in the closed position.
Figure 2A:
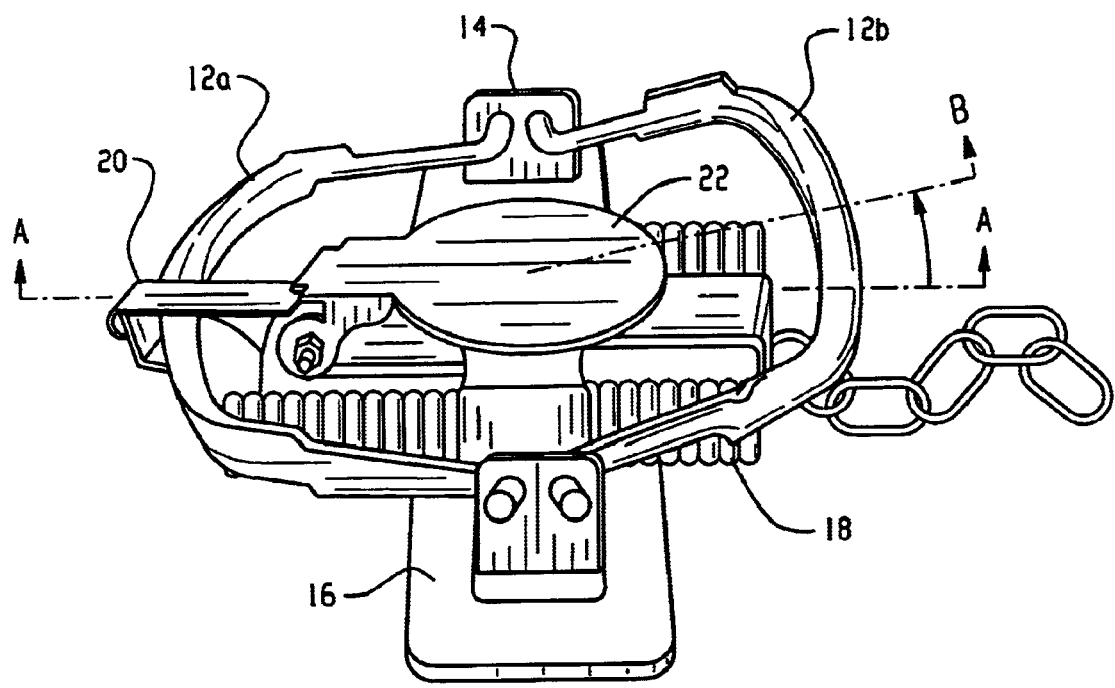
FIGS. 2A and 2B are respective overhead oblique and side views depicting a previous-type trap in the opened position.
Figure 2B:
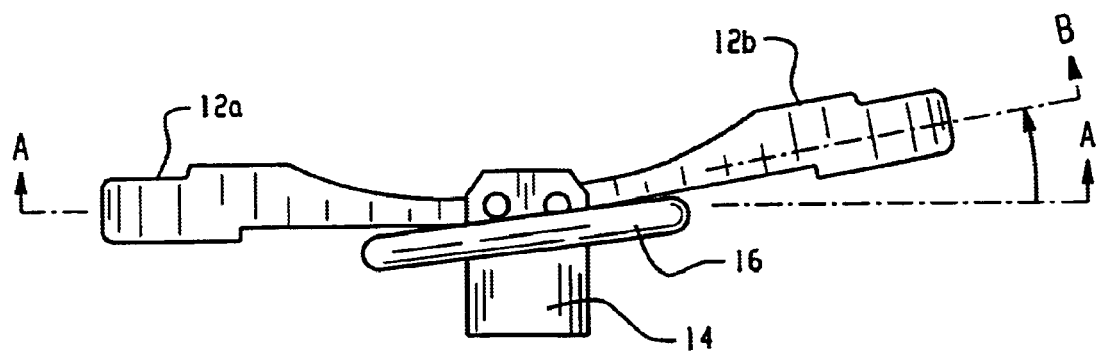

In the invention as shown in the remaining figures, like reference numerals are understood to refer to like elements. The problems encountered with previous traps are addressed by the trap 110 of the present invention which includes a leveling structure for allowing the second jaw 112b to lie in the same plane with the first jaw 112a.

Figure 3A:
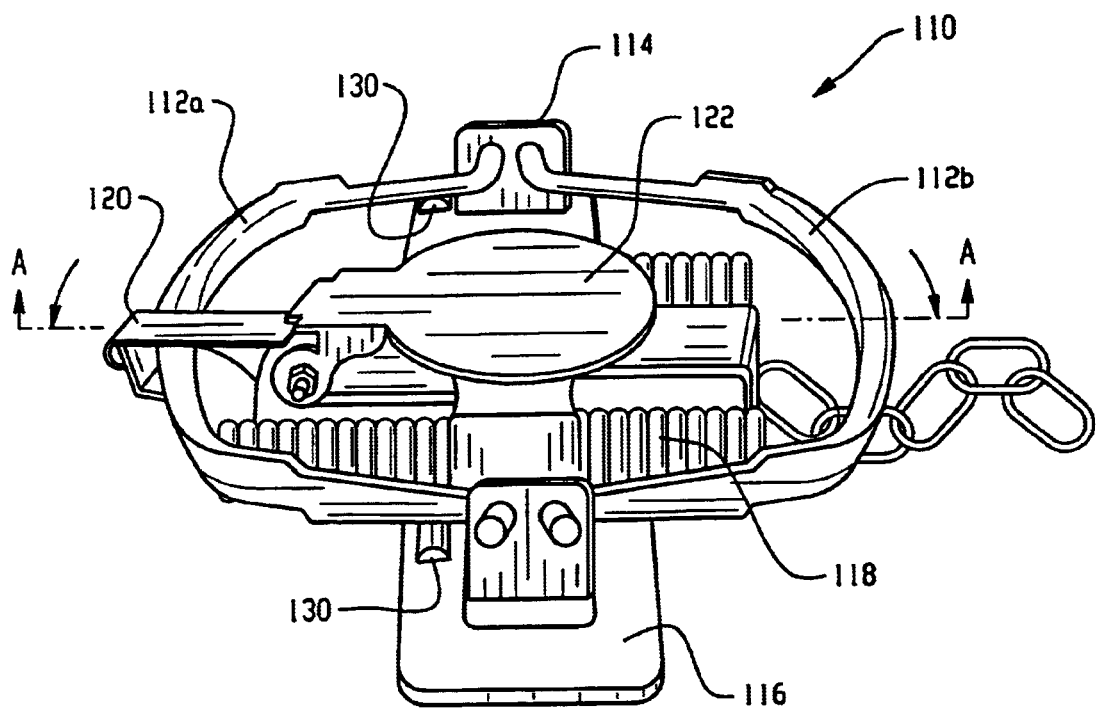
FIGS. 3A and 3B are respective overhead oblique and side views depicting a trap in the opened position in accordance with the present invention.
Figure 3B:
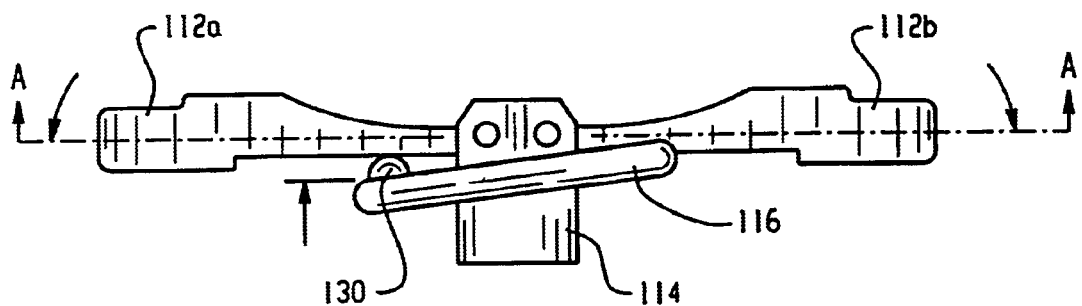

The trap 110 of the present invention is generally shown in FIGS. 3A and 3B. A pair of co-acting jaws 112a, 112b are used to securely engage the leg or other member of a captured animal. The ends of the jaws 112a, 112b are pivotally connected to a body portion 114 for pivotal displacement between an opened position (for a set trap) and a closed position (for engagement with a captured animal). A pair of levers 1116 are loaded with a biasing force from an arrangement of springs 118. In this way, the levers 116 bias the jaws 112a, 112b into the closed position.

To set the trap, as shown in FIG. 3A, the levers 116 are depressed, loading the springs 118 and allowing the jaws 112a, 112b to be placed in the opened position, along a level line A—A as shown in FIGS. 3A and 3B. The first jaw 112a is placed level and a retaining arrangement is provided for retaining the first jaw in the opened position. The retaining arrangement includes a dog 120 that is laid over the top of the loaded first jaw 112a. The retaining arrangement also includes a pan 122 which enables the release of the loaded jaws 112a, 112b upon actuation of the trap 110. After placing the dog 120 over the top of the loaded first jaw 112a, the end of the dog 120 is placed underneath the pan 122. In this way, the dog 120 and the pan 122 retain the jaws 112a, 112b in the opened position, with the spring-biased levers 116 fully loaded. When an animal steps on the pan 122, the trap 110 is actuated as the pan 122 tilts to release the dog 120, which in turn releases the jaw 112a and springs the trap, where the loaded levers 116 pivot the jaws 112a, 112b to the closed position, securely capturing the animal.

Figure 4A:
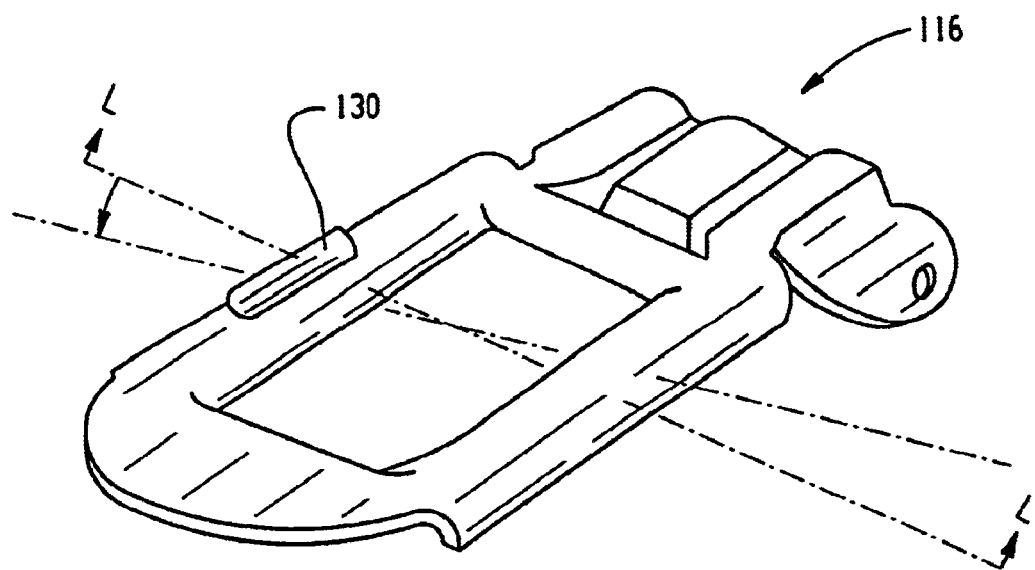
FIGS. 4A and 4B respectively show detailed views of the lever with leveling structures, in accordance with various embodiments of the present invention.

As shown generally in FIGS. 3A and 3B, each lever 116 includes a leveling structure, such as a raised portion 130. The first jaw 112a in the opened position makes contact with the leveling structure and further depresses each lever 116 by an additional amount (indicated by an arrow in FIG. 3B). The leveling structure thereby provides a substantially raised contact surface for the depressed side of each lever 116 that is level with the contact surface of the respective elevated side. As also shown in FIG. 4A, the top of the raised portion 130 and the elevated side would both lie along a level line L—L, so as to provide level contact surfaces for the respective jaws 112a, 112b. In this way, the torsional twist or deformation of the lever is accommodated so that the first jaw 112a and the second jaw 112b both lie on level contact surfaces along level line A—A, thereby eliminating the "jaw lift."

It is to be appreciated that the leveling structure of the present invention can be realized in any manner that would accomplish the desired function. As shown in FIGS. 3A, 3B and 4A, the leveling structure can be a raised portion 130. This raised portion 130 can be formed directly into the lever 116 during a stamping operation, or can be a small portion fastened to the lever 116 by welding. As indicated in FIG. 3A, the first jaw 112a is supported on both sides, and so each lever 116 has a raised portion 130.

Figure 4B:
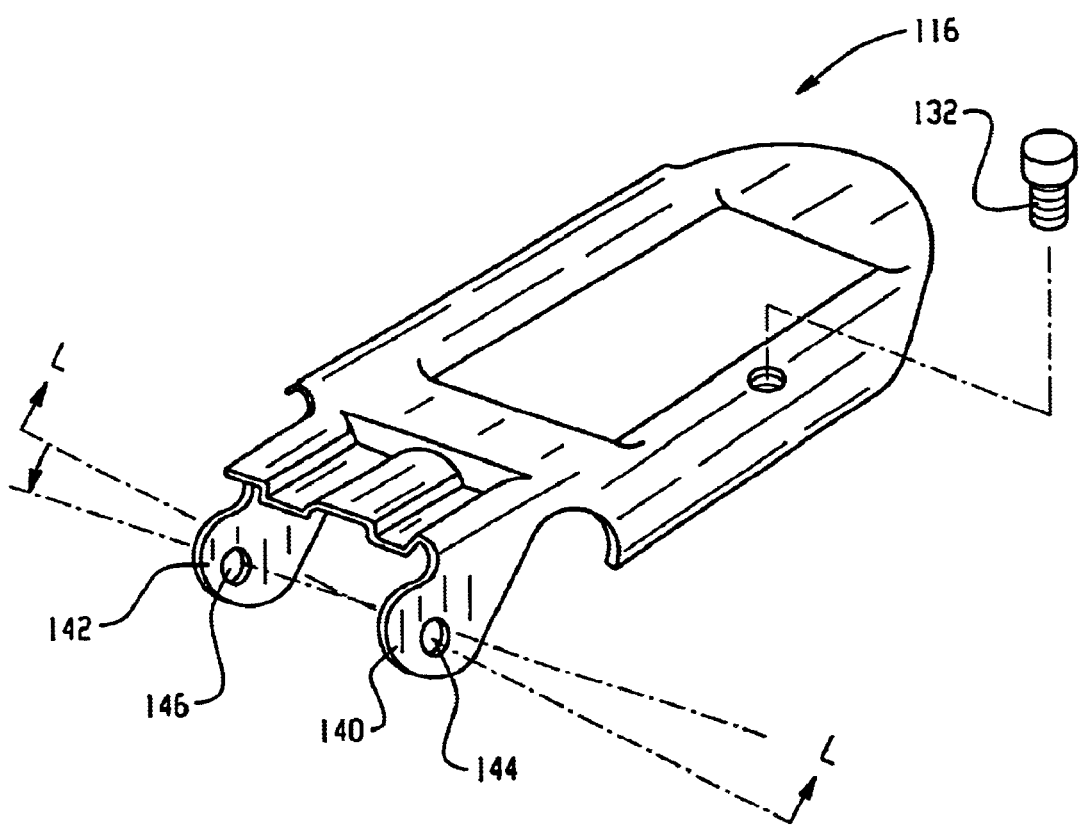

In an alternate embodiment shown in FIG. 4B, the leveling structure can include a set screw 132 to allow adjustable setting of the leveling structure, to accommodate product variations or any desired adjustment to the jaw lift by an end-user. A further alternate embodiment is contemplated, which can be used in addition to or instead of the raised portion 130 or the set screw 132. As shown in FIG. 4B, the levers 116 include first and second hinges 140, 142. These hinges 140, 142 include respective first and second holes 144, 146 such that the second hole 146 is formed lower than the first hole 144. The second hole 146 is formed at a lower position so as to accommodate a predetermined angle of torsional twist in the levers 116. By placing the holes 114, 146 off-center in the manner, the levers 116 are fashioned to anticipate the amount of torsional twist, and the contact surfaces of the levers 116 are automatically leveled to eliminate "jaw lift" upon loading the trap 110.

It should be noted from the figures that the respective levers 116 are "mirror-symmetrical" in that each leveling structure is formed on the opposite side from the respective other lever 116, so as to support the first jaw 112a. That is, one lever 116 has the leveling structure on a "left-side" and the respective other lever 116 had the leveling structure on the "right-side." in this manner, the assembled trap 110 would have opposing leveling structures for both making contact with the first jaw 112a. In this way, each lever 116 can be regarded as either "right-handed" or "left-handed."

The present invention discloses a trap 110 with reduced jaw lift, resulting in trap setting that is more accurate and reliable and less prone to inadvertent and untimely springing without capturing an animal. As described hereinabove, the present invention solves may problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

What is claimed:

1. A trap comprising:
    first and second co-acting jaws for pivotally engaging a member of a captured animal, wherein the first and second jaws are configured for pivotal displacement between an opened position and a closed position;
    at least one lever for contacting the first and second jaws, and loaded with a biasing force for loading the first and second jaws into the closed position, wherein the at least one lever experiences torsional deformation when loaded;
    a retaining arrangement for retaining the first jaw in the opened position, wherein the retaining arrangement releases the loaded first and second jaws from the at least one lever upon actuation;
    a leveling structure, incorporated onto the at least one lever, for providing a raised contact surface for one of the first and second jaws so as to accommodate the torsional deformation of the at least one lever and thereby provide level alignment of the respective first and second jaws.

2. The trap of claim 1 wherein the leveling structure comprises a raised portion formed onto the at least one lever.

3. The trap of claim 1 wherein the leveling structure comprises a set screw for allowing adjustable setting of the leveling structure.

4. The trap of claim 1 wherein the at least one lever comprises first and second hinges, wherein the hinges include respective first and second holes for pivotally retaining the first and second jaws, wherein the leveling structure further comprises the first and second holes such that the second hole is formed lower than the first hole, so as to anticipate the torsional deformation and thereby provide level contact surfaces of the levers for the first and second jaws.

5. The trap of claim 1 wherein the at least one lever comprises two levers on opposing sides and wherein a leveling structure is fashioned on each lever on an opposite side from the respective other lever.

6. The trap of claim 1 wherein the retaining arrangement includes a dog that is laid over the top of the loaded first jaw, and a pan which enables the release of the loaded jaws upon actuation such that the dog is placed over the top of the loaded first jaw and the end of the dog is engages the pan so as to releasably retain the jaws in the opened position.

7. A trap comprising:
    first and second co-acting jaws for pivotally engaging a member of a captured animal, wherein the first and second jaws are configured for pivotal displacement between an opened position and a closed position;
    at least one lever for contacting the first and second jaws, and loaded with a biasing force for loading the first and second jaws into the closed position, wherein the at least one lever experiences torsional deformation when loaded, wherein the at least one lever comprises first and second hinges, wherein the hinges include respective first and second holes for pivotally retaining the first and second jaws;
    a retaining arrangement for retaining the first jaw in the opened position, wherein the retaining arrangement releases the loaded first and second jaws from the at least one lever upon actuation;
    a leveling structure comprises the first and second holes such that the second hole is formed lower than the first hole, so as to anticipate the torsional deformation and thereby provide level contact surfaces of the levers for the first and second jaws.

8. The traps of claim 7 wherein the leveling structure further comprises a raised contact surface, incorporated onto the at least one lever, for contacting one of the first and second jaws so as to accommodate the torsional deformation of the at least one lever.

9. The trap of claim 8 wherein the leveling structure further comprises a raised portion formed onto the at least one lever.

10. The trap of claim 8 wherein the leveling structure comprises a set screw for allowing adjustable setting of the leveling structure.

11. The trap of claim 7 wherein the at least one lever comprises two levers on opposing sides and wherein a leveling structure is fashioned on each lever on an opposite side from the respective other lever.

12. The trap of claim 7 wherein the retaining arrangement includes a dog that is laid over the top of the loaded first jaw, and a pan which enables the release of the loaded jaws upon actuation such that the dog is placed over the top of the loaded first jaw and the end of the dog is engages the pan so as to releasably retain the jaws in the opened position.

* * * * *